(12) United States Patent
Massand

(10) Patent No.: US 7,818,678 B2
(45) Date of Patent: Oct. 19, 2010

(54) COLLABORATIVE DOCUMENT DEVELOPMENT AND REVIEW SYSTEM

(75) Inventor: Deepak Massand, McLeansville, NC (US)

(73) Assignee: Litera Technology LLC, McLeansville, NC (US)

( * ) Notice: Subject to any disclaimer, the term of this patent is extended or adjusted under 35 U.S.C. 154(b) by 951 days.

(21) Appl. No.: 10/285,910

(22) Filed: Oct. 31, 2002

(65) Prior Publication Data

US 2004/0085354 A1    May 6, 2004

(51) Int. Cl.
G06F 3/00 (2006.01)
(52) U.S. Cl. .................. 715/751; 715/752; 715/753; 715/754; 715/756
(58) Field of Classification Search ......... 715/750–759, 715/700
See application file for complete search history.

(56) References Cited

U.S. PATENT DOCUMENTS

| | | |
|---|---|---|
| 3,920,895 A | 11/1975 | Vieri et al. |
| 3,920,896 A | 11/1975 | Bishop et al. |
| 5,008,853 A | 4/1991 | Bly et al. |
| 5,129,082 A | 7/1992 | Tirfing et al. |
| 5,146,552 A | 9/1992 | Cassorla et al. |
| 5,204,947 A | 4/1993 | Bernstein et al. |
| 5,321,505 A | 6/1994 | Leddy |
| 5,341,469 A | 8/1994 | Rossberg et al. |
| 5,515,491 A | 5/1996 | Bates et al. |
| 5,539,871 A | 7/1996 | Gibson |
| 5,596,700 A | 1/1997 | Darnell et al. |
| 5,596,705 A | 1/1997 | Reimer et al. |
| 5,659,676 A | 8/1997 | Redpath |
| 5,669,005 A | 9/1997 | Curbow et al. |
| 5,671,428 A | 9/1997 | Muranaga et al. |
| 5,694,544 A | 12/1997 | Tanigawa et al. |
| 5,706,452 A | 1/1998 | Ivanov |
| 5,706,502 A | 1/1998 | Foley et al. |
| 5,708,826 A | 1/1998 | Ikeda et al. |
| 5,708,845 A | 1/1998 | Wistendahl et al. |
| 5,740,444 A | 4/1998 | Frid-Nielsen |
| 5,752,055 A | 5/1998 | Redpath et al. |
| 5,758,313 A | 5/1998 | Shah et al. |
| 5,761,419 A | 6/1998 | Schwartz et al. |
| 5,761,499 A | 6/1998 | Sonderegger |
| 5,781,732 A | 7/1998 | Adams |

(Continued)

OTHER PUBLICATIONS

U.S. Appl. No. 12/413,486 filed on Mar. 27, 2009.

(Continued)

*Primary Examiner*—Simon Ke
(74) *Attorney, Agent, or Firm*—Finnegan, Henderson, Farabow, Garrett & Dunner, LLP

(57) ABSTRACT

A computer software product for allowing simultaneous multi-level collaboration, including in real time between an author and a group of reviewers invited by the author to comment on a document stored in a computer file. The computer software enables each reviewer to view the document and make changes thereto which are stored in a secondary data file without modifying the contents of the original document. The author receives and views the secondary data files from the reviewers and selectively incorporates the changes into the document. Each reviewer may invite an unlimited number of sub-reviewers to review the document, the comments of each sub-reviewer similarly being stored in a secondary data file wherein only the author may edit the document directly.

27 Claims, 10 Drawing Sheets

U.S. PATENT DOCUMENTS

| | | | |
|---|---|---|---|
| 5,781,901 A | 7/1998 | Kuzma | |
| 5,787,175 A | 7/1998 | Carter | |
| 5,799,191 A | 8/1998 | Moriyasu et al. | |
| 5,801,702 A | 9/1998 | Dolan et al. | |
| 5,809,512 A | 9/1998 | Kato | |
| 5,860,073 A | 1/1999 | Ferrel et al. | |
| 5,864,870 A | 1/1999 | Guck | |
| 5,870,754 A | 2/1999 | Dimitrova et al. | |
| 5,878,421 A | 3/1999 | Ferrel et al. | |
| 5,890,177 A * | 3/1999 | Moody et al. | 715/210 |
| 5,893,126 A | 4/1999 | Drews et al. | |
| 5,911,776 A | 6/1999 | Guck | |
| 5,931,906 A | 8/1999 | Fidelibus, Jr. et al. | |
| 5,937,066 A | 8/1999 | Gennaro et al. | |
| 5,938,724 A | 8/1999 | Pommier et al. | |
| 5,944,785 A | 8/1999 | Pommier et al. | |
| 5,949,413 A | 9/1999 | Lerissa et al. | |
| 5,950,214 A | 9/1999 | Rivette et al. | |
| 5,956,736 A | 9/1999 | Hanson et al. | |
| 5,958,006 A | 9/1999 | Eggleston et al. | |
| 5,978,836 A | 11/1999 | Ouchi | |
| 5,987,469 A | 11/1999 | Lewis et al. | |
| 6,009,462 A | 12/1999 | Birrell et al. | |
| 6,014,135 A | 1/2000 | Fernandes | |
| 6,029,171 A | 2/2000 | Smiga et al. | |
| 6,064,751 A | 5/2000 | Smithies et al. | |
| 6,067,551 A | 5/2000 | Brown et al. | |
| 6,088,709 A | 7/2000 | Watanabe | |
| 6,119,147 A | 9/2000 | Tommey et al. | |
| 6,158,903 A | 12/2000 | Schaeffer et al. | |
| 6,178,431 B1 | 1/2001 | Douglas | |
| 6,182,080 B1 | 1/2001 | Clements | |
| 6,212,534 B1 | 4/2001 | Lo et al. | |
| 6,243,722 B1 | 6/2001 | Day et al. | |
| 6,275,223 B1 * | 8/2001 | Hughes | 715/751 |
| 6,289,460 B1 | 9/2001 | Hajmiragha | |
| 6,317,777 B1 | 11/2001 | Skarbo et al. | |
| 6,334,141 B1 | 12/2001 | Varma et al. | |
| 6,336,134 B1 | 1/2002 | Varma | |
| 6,343,313 B1 | 1/2002 | Salesky et al. | |
| 6,360,236 B1 | 3/2002 | Khan et al. | |
| 6,363,352 B1 | 3/2002 | Dailey et al. | |
| 6,411,989 B1 | 6/2002 | Anupam et al. | |
| 6,502,113 B1 | 12/2002 | Crawford et al. | |
| 6,560,637 B1 * | 5/2003 | Dunlap et al. | 709/204 |
| 6,590,584 B1 * | 7/2003 | Yamaura et al. | 715/704 |
| 6,643,663 B1 * | 11/2003 | Dabney et al. | 707/102 |
| 6,687,878 B1 * | 2/2004 | Eintracht et al. | 715/201 |
| 6,708,172 B1 * | 3/2004 | Wong et al. | 707/10 |
| 7,251,680 B2 | 7/2007 | DeVos | |
| 2001/0037367 A1 * | 11/2001 | Iyer | 709/204 |
| 2002/0049786 A1 | 4/2002 | Bibliowicz et al. | |
| 2002/0059342 A1 | 5/2002 | Gupta et al. | |
| 2002/0059343 A1 | 5/2002 | Kurishima et al. | |
| 2002/0065848 A1 | 5/2002 | Walker et al. | |
| 2002/0078088 A1 | 6/2002 | Kuruoglu et al. | |
| 2002/0085030 A1 * | 7/2002 | Ghani | 345/751 |
| 2002/0107886 A1 | 8/2002 | Gentner et al. | |
| 2002/0143691 A1 | 10/2002 | Ramaley et al. | |
| 2003/0112273 A1 * | 6/2003 | Hadfield et al. | 345/751 |
| 2003/0158855 A1 * | 8/2003 | Farnham et al. | 707/102 |
| 2003/0197730 A1 * | 10/2003 | Kakuta et al. | 345/758 |
| 2004/0205653 A1 | 10/2004 | Hadfield et al. | |
| 2006/0167879 A1 * | 7/2006 | Umeki et al. | 707/8 |
| 2006/0253482 A1 * | 11/2006 | Zellweger et al. | 707/100 |
| 2007/0186157 A1 * | 8/2007 | Walker et al. | 715/530 |

OTHER PUBLICATIONS

U.S. Appl. No. 12/350,144 filed on Jan. 7, 2009.
U.S. Appl. No. 12/406,093 filed on Mar. 17, 2009.

* cited by examiner

ARTICLE III - ARCHIVE COPIES

End user may make archival copies of those portions of LICENSOR's product(s) that are provided on a machine readable media, provided such copies are for the End User's personal use on one microcomputer and that no more than one such copy is used at any time unless End User has paid for multiple copy use as described in ARTICLE IV of this Agreement.

ARTICLE IV - SINGLE CPU

LICENSOR use licenses are applicable to a single microcomputer installation in the event End User intends to use a LICENSOR product or any part thereof on more than one microcomputer, the license fee for each such multiple use must be purchased. Quantity discounts in accordance with LICENSOR policy will apply. In the event of simultaneous use, a license must be obtained for each instance of possible simultaneous execution.

ARTICLE V – ASSIGNMENT

In the event End User wishes to transfer the rights granted by this agreement, retaining none thereby, a letter requesting such transfer accompanied by the original diskette or label therefrom, must be sent to LICENSOR. LICENSOR will then select the most appropriate method for distribution of the transferred rights.

ARTICLE VI – LIMITED WARRANTY

LICENSOR warrants that all materials furnished by LICENSOR constitute an accurate manufacture of LICENSOR products and will replace any SUBLICENSOR furnished material to be thus

File  Edit  View  Insert  Tools

ARTICLE III – ARCHIVE COPIES

End user may make archival copies of those portions of LICENSOR's product(s) that are provided on a machine readable media, provided such copies are for the End User's personal use on one microcomputer and that no more than one such copy is used at any time unless End User has paid for multiple copy use as described in ARTICLE IV of this Agreement.

ARTICLE IV - SINGLE CPU (SIDEBAR PARAGRAPH)

ARTICLE V – ASSIGNMENT

In the event End User wishes to transfer the rights granted by this agreement, retaining none thereby, a letter requesting such transfer accompanied by the original diskette or label therefrom, must be sent to LICENSOR. LICENSOR will then select the most appropriate method for distribution of the transferred rights.

ARTICLE VI – LIMITED WARRANTY

LICENSOR warrants that all materials furnished by LICENSOR constitute an accurate manufacture of LICENSOR products and will replace any SUBLICENSOR furnished material to be thus defective, provided such defect is found within ten days of purchase by End User. However, LICENSOR makes NO express or implied warranty of any kind with regard to performance or accuracy of data of any kind nor for any consequential damages resulting therefrom whether through loss or inaccuracy of data that

Comments  |  User Selection

L1R3@litera.com
Tuesday, October 22, 2002, 08:00 PM

End User may make one archival cop ies of those portions of LICENSOR's product(s) that are provided on a machine readable media, provided such copy ies is are for the End User's personal use on 128a Reviewer: L1R1  92

Document: Doc1.txt  94

Suggested Changes: 96

| Location | Contents | Comments | Date / Time |
|---|---|---|---|
| Paragraph 1 | Delete "Prior" add "before" | " Use less formal language have | 10-22-02 5:00 pm |
| Paragraph 2 | add "is not peace" between "and" and "basically" | | 10-22-02 5:32 pm |

FIG. 9

ARTICLE III - ARCHIVE COPIES

End user may make archival copies of those portions of LICENSOR's product(s) that are provided on a machine readable media, provided such copies are for the End User's personal use on one microcomputer and that no more than one such copy is used at any time unless End User has paid for multiple copy use as described in ARTICLE IV of this Agreement.

ARTICLE IV - SINGLE CPU

LICENSOR use licenses are applicable to a single microcomputer installation in the event End User intends to use a LICENSOR product or any part thereof on more than one microcomputer, the license fee for each such multiple use must be purchased. Quantity discounts in accordance with LICENSOR policy will apply. In the event of simultaneous use, a license must be obtained for each instance of possible simultaneous execution.

ARTICLE V – ASSIGNMENT

In the event End User wishes to transfer the rights granted by this agreement, retaining none thereby, a letter requesting such transfer accompanied by the original diskette or label therefrom, must be sent to LICENSOR. LICENSOR will then select the most appropriate method for distribution of the transferred rights.

ARTICLE VI – LIMITED WARRANTY

LICENSOR warrants that all materials furnished by LICENSOR constitute an accurate manufacture of LICENSOR products and will replace any SUBLICENSOR furnished material to be thus

---

Comments | User Selection

L1R3@litera.com
Tuesday, October 22, 2002, 08:00 PM

End User may make one archival copy ies of those portions of LICENSOR's product(s) that are provided on a machine readable media, provided such copy ies is are for the End User's personal use on L1R2@litera.com
Tuesday, October 22, 2002, 07:52 PM End User may not make archival copies of those portions of LICENSOR's product(s) that are provided on a machine readable media, provided unless such copies are for the End User's personal use on one L1R1@litera.com
Tuesday, October 22, 2002, 07:46 PM End User may is allowed to make archival copies of those portions of LICENSOR's product(s) that are provided on a

FIG. 10

COLLABORATIVE DOCUMENT DEVELOPMENT AND REVIEW SYSTEM

FIELD OF THE INVENTION

This invention relates generally to a computer-based document development and review system, and more particularly to a computer product which allows document collaboration among a plurality of computer users over a network.

BACKGROUND OF THE INVENTION

Prior to the widespread introduction of computers, document collaboration was typically accomplished by distributing a paper copy of a document sequentially, or by distributing multiple copies simultaneously, to a number of reviewers for comment.

In sequential review, as shown in FIG. 1, a document owner 10 designates a number of reviewers 20 to review a document. Each reviewer 20 makes comments, often in the form of notes written by hand, directly on a single paper copy of the document, passing the document along to the next reviewer when finished. The result is a single document indicating all of the proposed changes. The most obvious drawback of this editing method is that it is inherently time-consuming, especially when the number of reviewers is large. Furthermore, although it may be desirable to ascertain the author of a particular comment, the fact that all the comments are contained on the same document complicates such identification. Finally, it may not be desirable to permit later reviewers to read comments made by those who came earlier.

Simultaneous review, as shown in FIG. 2, by its nature is less time-consuming than sequential review, and results in a plurality of edited copies of a document, each prepared by a particular reviewer 20. However, the collaborative process is not complete until a central reviewer aggregates the comments of each individual reviewer into a complete document. Often, the owner 10 performs this function. Thus, the owner 10 must resolve conflicts among the comments of the several reviewers which might not have occurred had some of the reviewers been able to read the comments of others.

Connecting personal computers to communication networks has eliminated the need for distribution of paper copies, and for the notation of comments on documents by hand. Unfortunately, however, the collaborative process generally continues to be patterned after the work flow models described above. For example, Microsoft Word®, by Microsoft Corporation, of Redmond, Wash. provides revision tracking tools such as "redlining" which enable a reviewer to insert revisions as comments within a document in much the same way as comments are indicated on a manually marked-up paper copy of a document.

Although Microsoft Word® and other word processing software allows the author of a document to send a copy to many reviewers via e-mail or over the web or intranets, and each reviewer can make and track changes, the redlined document may only represent the changes suggested by one or more of several reviewers. When a large number of reviewers is involved in the collaboration, it becomes difficult to combine each reviewer's comments into a finished document. Extensive merging and/or cutting and pasting is necessary before the author even has a single document containing all the comments suggested by the reviewers.

There are some products, such as Workshare Synergy® by Workshare Technology of London, England that adds collaboration features to Microsoft Word by changing the view and the process of compiling and integrating proposed changes from multiple individuals into a single document. However, Synergy is an applet, or software that is dependent entirely upon an application such as Microsoft Word® for its functionality. Furthermore, in Workshare Synergy®, the comments are sorted by reviewer with separate tabs denoting each reviewer's comments. This is problematic for multi-user collaborations because the most common workflow for authors is to review all the comments on a section-by-section or paragraph-by-paragraph basis. Still further, the document and the reviewers' comments cannot be reviewed side-by-side.

An additional drawback of current collaboration products will be noted by the author who, having received the comments of the reviewers, wishes to accept one or more of the suggested changes. In order to do so, the author must "scroll through" every comment made by every reviewer and elect to accept or reject the suggestions one by one. Thus, an author wishing to accept even one of 100 changes suggested must reject the remaining 99.

Thus, current computer-based collaboration products closely follow the paper-based collaboration methods upon which they are based, directly incorporating features of paper-based collaboration that are not necessary to or appropriate for the electronic transfer of documents. Particularly, the current collaboration products emulate the practice of directly "marking up" a paper copy of the document by its reviewers. Although this has proven to be the most efficient way to conduct manual document collaboration, it does not translate well into a method for electronic document collaboration.

Therefore, a need exists for a computer-based document collaboration system in the form of stand-alone software that will allow a plurality of reviewers to simultaneously review a single document on a plurality of computers and submit comments on the document wherein the comments of each reviewer are stored and indexed separately from the document and from those of other reviewers and forwarded to an editor or author without modifying the underlying document.

A further need exists for a computer-based document collaboration system that displays the comments of the plurality of reviewers in a first window on a single screen at the same time as the it displays the document in a second window, allowing the editor or author to scroll through portions of the document and view the identity of the reviewer and the comments suggested on that portion of the document. It is desirable for such a system to enable the author or editor to selectively incorporate the comments of each reviewer into the document. It is further desirable, but not essential to provide a "thin client" in the form of software that can be sent with or separately from the document to an author, editor or reviewer to enable the display of the document and comments, and to allow the selective incorporation of comments by an author or editor independent of other word-processing software.

A still further need exists for a computer-based document collaboration system having a hierarchical structure wherein an author or editor may, for example, submit a document to a plurality of first-level reviewers hierarchically subordinate to the author or editor. Each first-level reviewer may in turn submit the document to a line of hierarchically subordinate second-level reviewers. It is desirable for an unlimited number of lines of reviewers of a document to be accommodated within unlimited hierarchical levels. A set of rules associated with the hierarchy defines which hierarchical rank and line may review comments generated by those in other ranks within the same line.

SUMMARY OF THE INVENTION

In accordance with the invention, a computer-based document collaboration system for managing the input of a plurality of reviewers is provided. A master data file contains a document which may be in any one of a number of known document formats such as HTML, TXT, DOC, RTF, DOT, etc. stored on at least one computer for display on one or more display devices. A secondary data file is associated with the document and with at least one of the reviewers. When the reviewer modifies the document displayed on the display device, the computer captures the modifications and stores them in the secondary data file. It is desirable that the secondary data file include an index referencing the portion of the document in which the modification was made and the contents of the modification, for example, on a paragraph-by-paragraph basis. In further accordance with this aspect of the invention, a plurality of computers may be connected over a network so that the master data file can be viewed on several computers simultaneously. Each of the computers thus connected to the network are preferably provided with an editing means, allowing a reviewer stationed at one of the networked computers to make what appear to be ordinary modifications to the document which are instead stored to the secondary data file associated with that reviewer. The secondary data file can then be sent, for example, to the author of the document.

In accordance with a further aspect of the invention a computer-based document collaboration system for managing the input of a plurality of reviewers is provided wherein, for example, the author of a document invites a number of users to act as reviewers and receives a secondary data file from one or more of the reviewers. At least one computer is provided with a graphical user interface which divides its display into at least a first portion in which the document is displayed, and a second portion in which the contents of the secondary file are displayed. Ideally, each of the paragraphs, that has generated a comment or modification from any one or multiple reviewers, is demarcated with a color object or glyph to allow easy spotting of where the modifications are. Additionally, as the author scrolls through the document in the first portion of the graphical user interface, the contents of the indexed modifications are displayed in the second portion of the display. The author may then selectively accept the modifications into the document. Thus, the author or editor of a document, having sent the document, for example, over a network to several reviewers and having received a secondary document associated with at least one of the reviewers, may review all the proposed changes to the document simultaneously on a paragraph-by-paragraph basis.

In accordance with a still further aspect of the invention, a computer-based document collaboration system for managing the input of a plurality of reviewers is provided having a hierarchical structure wherein ideally the author or editor of a document is designated as the document "owner", and is assigned the highest rank. The document is locked within owner's master data file and ideally the owner is the only one who may modify the contents of the master data file directly. The owner may invite a number of reviewers, these reviewers known for example as "level 1" reviewers, having a rank below that of the owner. In accordance with this aspect of the invention, each level 1 reviewer may view the document and make modifications which are recorded in the level 1 reviewer's secondary file without modifying the contents of the master data file. Additionally, each level 1 reviewer may invite additional reviewers having a rank below that of the level 1 reviewer, e.g. "2" reviewer. The level 2 reviewer may also make modifications to the document that are stored in that reviewer's secondary file without modifying the contents of the master data file. Thus, in accordance with this aspect of the invention, an unlimited number of hierarchical levels are created wherein review of the document contained in the master data file can take place simultaneously without directly editing the document.

In accordance with a still further aspect of the invention, a computer-based document collaboration system for managing the input of a plurality of reviewers is provided wherein the owner or any reviewer may designate an assistant to take over the rights of the respective owner or reviewer to accept or suggest changes to the document.

In accordance with a still further aspect of the invention, a computer-based document collaboration system for managing the input of a plurality of reviewers is provided wherein the owner may designate only select reviewers to provide input on specifically designated portions of the document.

In accordance with a still further aspect of the invention, a computer based document collaboration system for managing the input of a plurality of reviewers is provided wherein data management may be carried out entirely by a central database system.

In accordance with a still further aspect of the invention, a computer-based document collaboration system for managing the input of a plurality of reviewers is provided having a "thin client" which comprises sufficient computer code to enable a reviewer to view the contents of a master data file and record modifications in a secondary data file.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 7 is a plan view of a computer display showing an aspect of the present invention.

FIG. 8 is a plan view of a computer display showing an aspect of the present invention.

FIG. 9 is a chart illustrating an aspect of the present invention.

FIG. 10 is a plan view of a computer display showing an aspect of the present invention.

DETAILED DESCRIPTION OF THE PREFERRED EMBODIMENTS

Figure 1:
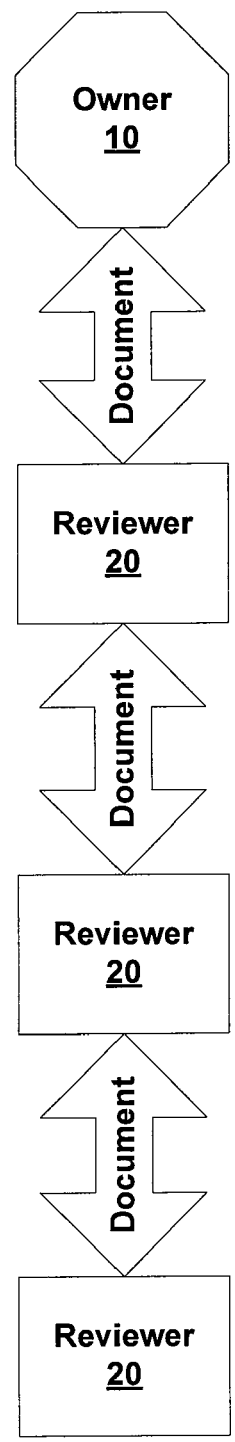
FIG. 1 is a block diagram illustrating a prior art method of document collaboration.
Figure 2:
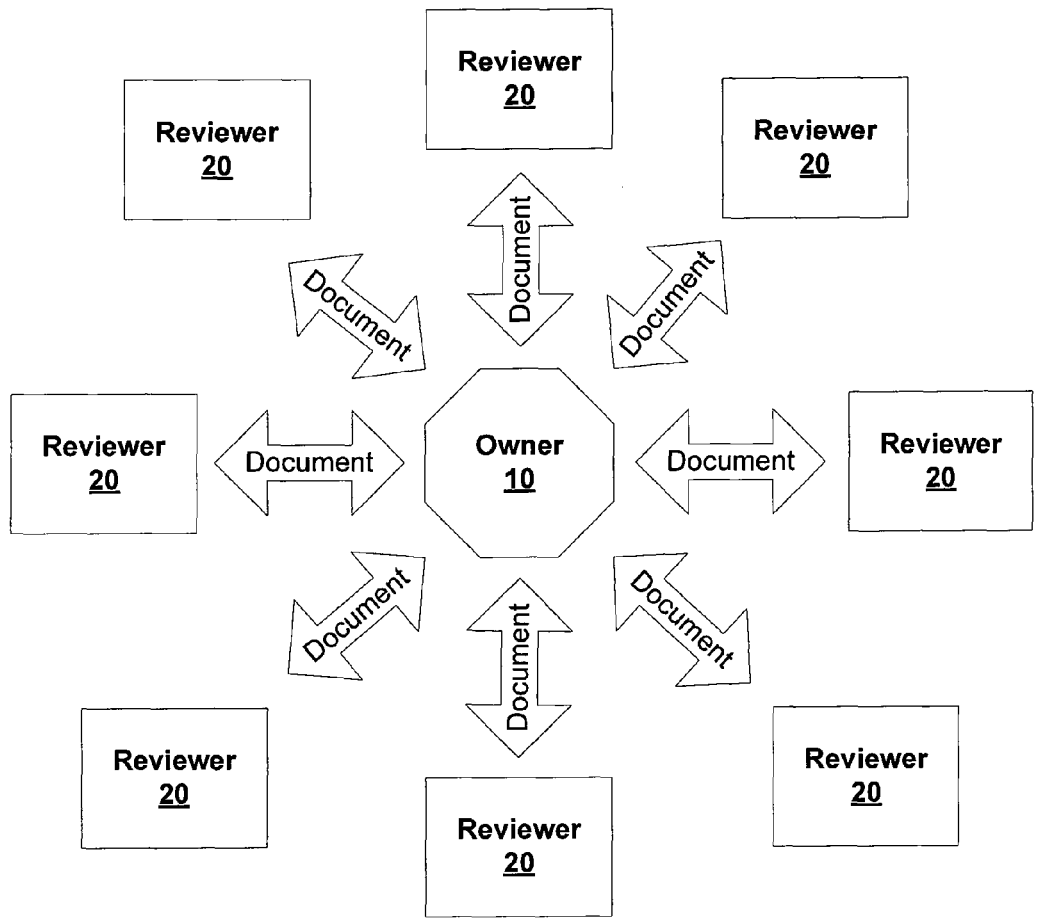
FIG. 2 is a block diagram illustrating a second prior art method of document collaboration.
Figure 3:
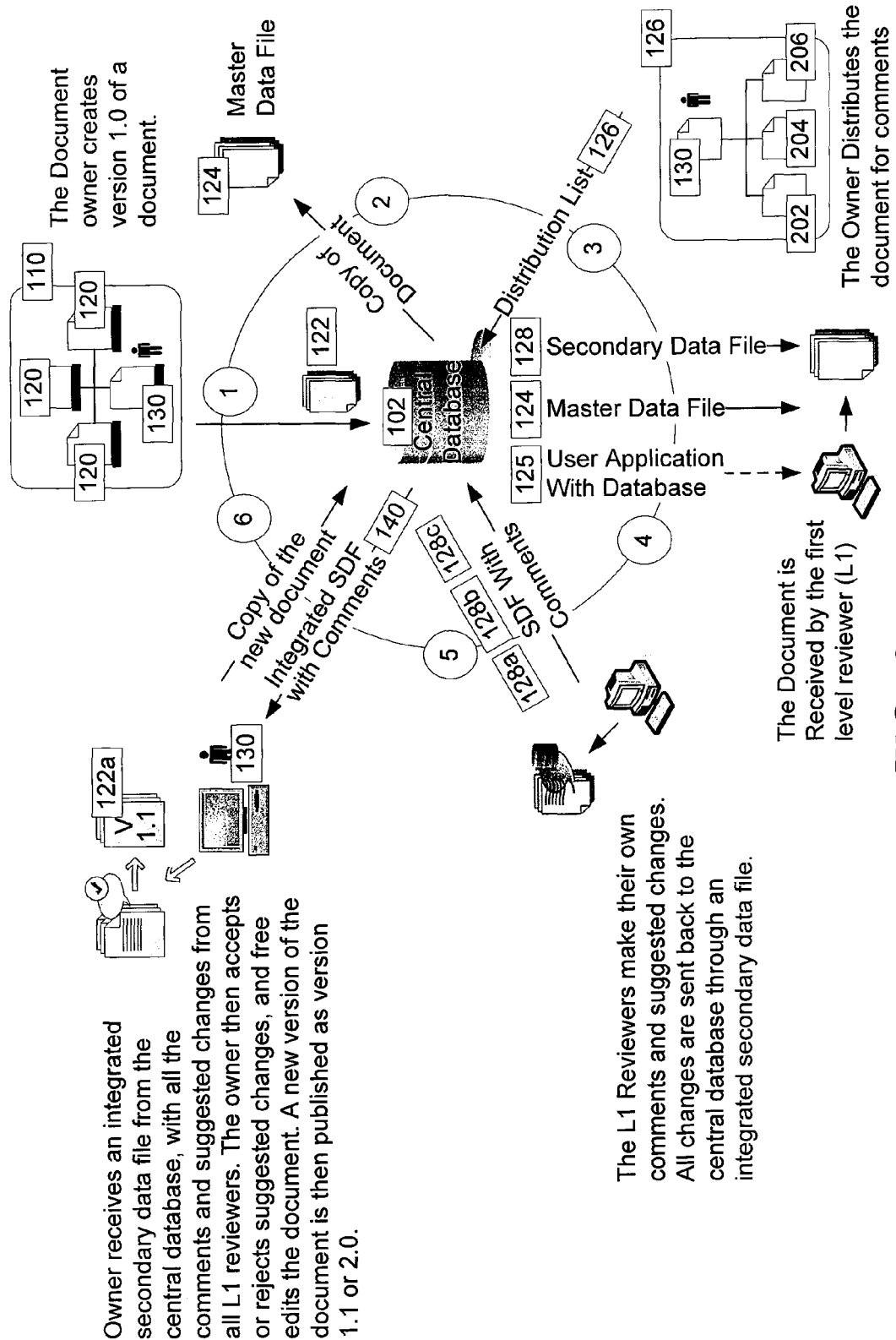
FIG. 3 is a flow chart illustrating the document review system of the present invention.

The present invention provides a computer-based document collaboration system. As shown in FIG. 3, an embodiment of the document collaboration system of the present invention is shown having a central database 102 connected to a network 110 of conventional personal computers or terminals 120. Such computer networks are well known in the art and typically but not necessarily comprise computers having a processing unit, a system memory, an input device, a display device and a system bus that couples these components to the processing unit. Additionally, a network controller is connected to the system bus for permitting the computer to communicate over a network. When used in a Local Area Network (LAN) environment, each personal computer 120 is connected to the local network 110 through such a network controller which may be configured to exchange information in one or more well known communication protocols such as TCP/IP. Alternatively, the computers in network 110 may be connected across a Wide Area Network (WAN) or over a Virtual Private Network (VPN) or other networks known in the art in which case other means such as a modem may be used for the purpose of establishing connections over the internet among personal computers 120.

Central database 102 is shown connected to network 110 and may be one of a number of well known database systems such as DB2 of IBM Corporation, Armonk, N.Y., Oracle® of Oracle Corporation, Redwood Shores Calif., SQL Server from Microsoft Corp., or Borland Paradox® of Borland Software Corporation, Scotts Valley, Calif. As shown below, the method and system of the present invention enables a plurality of users linked over network 110 to collaborate on a document simultaneously, the system being distributed between software components implemented in central database 102 and on personal computers 120. Preferably, as described in greater detail below, each of personal computers 120 is provided with some database capabilities, requiring the installation of some database components redundant to those of central database 102 on some or all of personal computers 120. Alternatively, it is possible to implement the system of the present invention without installing any software components on personal computers 120. In the latter case, personal computers 120 could function as or be replaced by terminals having only a display and suitable input/output capability.

The method and system of document collaboration is illustrated in FIG. 3 wherein user 130 is shown at step 1 having generated version 1.0 of a document 122. As the author of the document, user 130 is considered the "owner" with respect to document 122 which is stored in central database 102 and locked. Moving clockwise to step 2, the locked document 122 becomes the master data file 124 which preferably may be modified only by owner 130.

Next, as shown in step 3, the owner 130 then designates a number of users to whom master data file 124 is to be distributed or allowed access to by inviting those users to become reviewers of the document. For purposes of the present invention, a reviewer is an individual user or group of individual users who provide input on a document in the form of suggested changes which may include, but are not limited to, specific comments or edits to specific portions of the document. The owner 130 provides a list of reviewers to the central database 102 as distribution list 126. As shown, the owner 130 may invite reviewers, for example 202, 204 and 206 as reviewers of document 122. Each of reviewers 202, 204 and 206 are users preferably having personal computers 120 connected to network 110. In step 4, central database 102 then generates and preferably sends a secondary data file 128 to each reviewer designated in distribution list 126 and provides to each a copy of document 122 as locked master data file 124.

Figure 4:
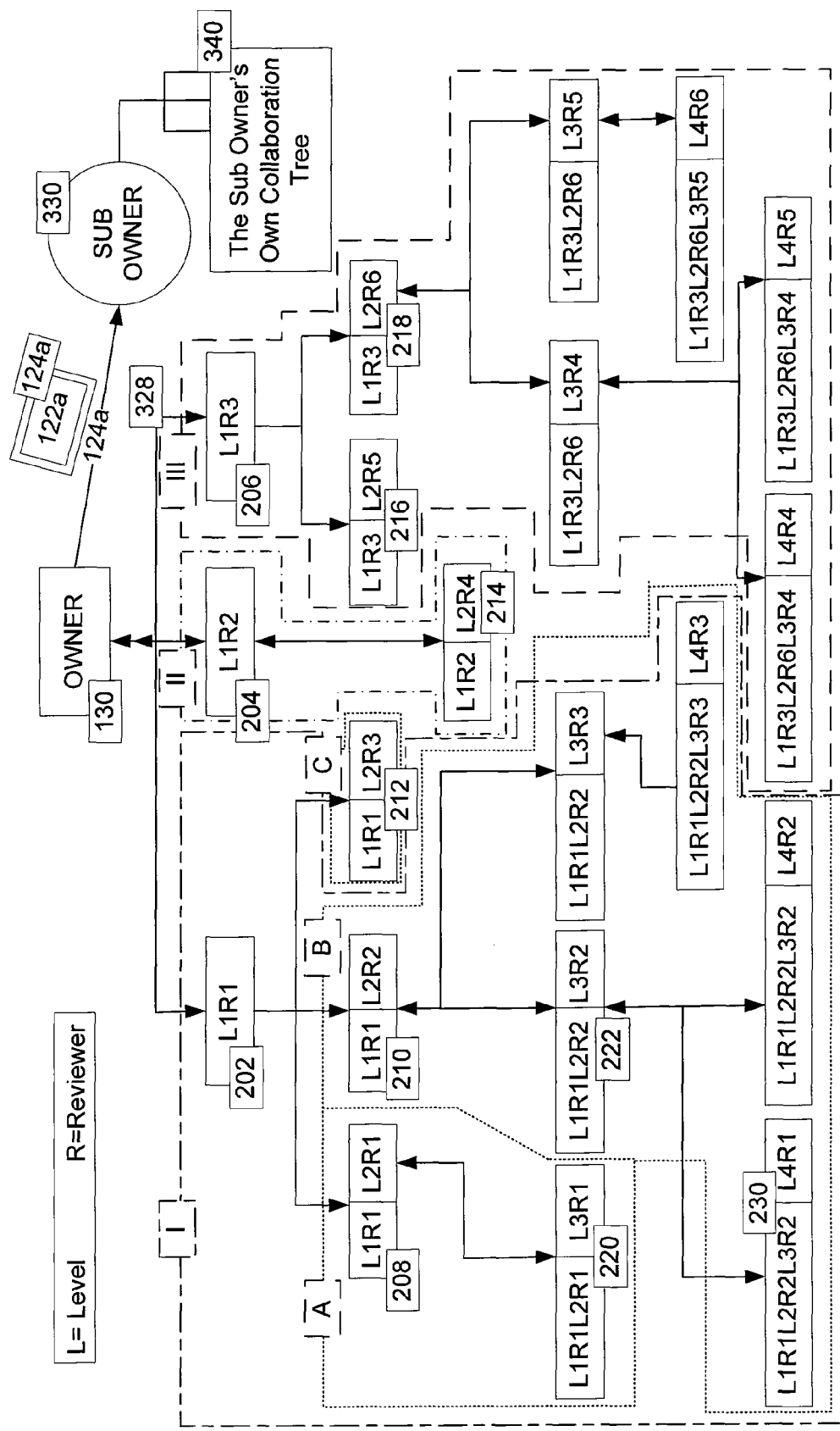
FIG. 4 is a diagram illustrating the hierarchical structure of the present invention.

As shown in greater detail in FIG. 4, a hierarchical relationship exists between owner 130 and reviewers 202, 204 and 206. Because they are one level below owner 130, reviewers 202, 204 and 206 are considered "level 1" or "L1" reviewers. An unlimited number of reviewers can exist at each level, and may be designated sequentially as reviewer 1, reviewer 2, reviewer 3, etc. or "R1, R2, R3 . . . ". Thus, each reviewer can be uniquely identified by the server based on the reviewer's level and order. As shown in FIG. 4, reviewer 202 is identified as "L1R1" which is a unique designation representing the reviewer's rank of level 1 and order as reviewer 1. Similarly, reviewer 204 is identified as "L1R2", and reviewer 206 is identified as "L1R3". Subsequent level 1 reviewers would be identified as "L1R4", "L1R5", etc. Although any identification scheme may be used in place of that shown in FIG. 4, the unique identification of each reviewer invited by owner 130 by the central database 102 is critical as described in detail below.

Corresponding to the hierarchy shown in FIG. 4, each secondary data file 128 (FIG. 3) is uniquely associated with one of the reviewers invited by owner 130 and is also associated with master data file 124. Although different hierarchies may be defined from that shown in FIG. 4, it is critical that each secondary data file have a unique association with only one reviewer, and that each reviewer's place on the hierarchy be ascertainable by the system. In the event that only one secondary data file is assigned to more than one individual, those individuals will be considered to be a single reviewer for purposes of the system of the present invention. Furthermore, although owner 130 may be recognized as the owner of document 122, owner 130 may simultaneously serve and be recognized by the system of the present invention as a reviewer of a different document, the author of that document having designated owner 130 by invitation to serve as reviewer.

Unlike the master data file 124 which contains a copy of document 122, the secondary data files contain no data when they are first received, by the designated reviewers 202, 204 and 206 in step 4 of FIG. 3, or created by the local or central database. To review the document, as shown in step 5 of FIG. 3, the reviewers may each view contents of master data file 124 and secondary data file 128 on a single display simultaneously, for example in separate side-by-side windows. An example of such a display 70 is shown in FIG. 7, wherein the text of a document contained in the master data file is displayed in editing window 72 and the contents of the secondary data file are shown in comment window 74.

A reviewer such as 202 who, as discussed above, has been assigned the unique hierarchical designation L1R1 may scroll through the document in editing window 72 and make changes which are recorded in the secondary data file and displayed in comment window 74 as shown in FIG. 8. Changes made in the text in editing window 72 appear as a suggestion 76 in comment window 74 along with the identity of the reviewer and the time of the change. The reviewer may also make comments 78 directly into the comment window such as an explanation or description of the comment. Alternatively, the document editing window itself can show the text of document 122 and any changes made thereto by the individual reviewer. In this case, window 74 showing the contents of the secondary data file can be toggled on or off by the reviewer. However, whether or not the reviewer's display shows the changes in the editing window 72, the contents of the document 122 are not modified. As discussed above, the text shown in editing window 72 is merely a copy of that found in master data file 124 which has been locked in step 2 of FIG. 3 to prevent the modification thereof by any reviewer.

The reviewers' suggested changes are captured and indexed in the secondary data file. As shown in step 5 of FIG. 3, each of reviewers 202, 204 and 206 populates secondary data files 128*a*, 128*b* and 128*c* respectively with suggested changes to document 122. For example, as shown in FIG. 9, the contents of an example of a secondary data file are shown wherein changes suggested by a reviewer such as reviewer 202 (identified as L1R1) have been captured in secondary data file 128*a* and indexed to the paragraphs in document 122 to which the suggested changes apply. Specifically, the file contains the identity 92 of the reviewer, the name 94 of the document being edited (identified as Doc1.txt) and a table 96 containing an indexed list of suggested changes made by a specific reviewer such as reviewer 202. Although many approaches to storing data such as that shown in FIG. 9 are known in the art, it is critical that the secondary data file 128 be associated with at least one document, such as document 122 and at least one reviewer, such as reviewer 202.

In the preferred embodiment, sufficient database capabilities are provided by software installed on the personal computers 120 used by reviewers 202, 204 and 206 such as Borland Paradox® to carry out the function of capturing the input made by each reviewer into the document editing window and copying that input to the respective secondary data files 128. This embodiment has the advantage of allowing each reviewer to populate a secondary file with suggested changes independently of their connection to the central database 102. Thus, in the event that the network connection between a particular personal computer 120 and the central database 102 is temporarily unavailable or interrupted, a reviewer could continue to add suggested changes to their secondary file to be synchronized with central database 102 when the network connection has been restored.

Further, the local database software necessary to enable any personal computer 120 connected to the network to carry out the functions of displaying and capturing suggested changes can be provided, for example by central database 102, as an attachment to master data file 124 or secondary data file 128. This software, or "thin client" 125 is shown in FIG. 3 as distributed to reviewers with master data file 124 and secondary data file 128 in step 4 in the event that any reviewers such as 202, 204 and 206 do not have the local database software installed on the personal computer 120 that the reviewer is using. However, the thin client 125 can be distributed to the reviewers at any point prior to step 5 wherein the editing actually takes place. Alternately, database capability similar to that provided by thin client 125 may be pre-installed on personal computers 120.

In an alternate embodiment, all database functions related to the capture of suggested changes are carried out by the central database 102. In this configuration, local database software is not required by the system of the present invention to enable a reviewer to populate a secondary data file, thus no software installation or thin client 125 is necessary. This provides the advantage of a significantly reduced computational capability on the part of personal computers 120. Fully implemented, the central database of such a system can take on the role of an application service provider wherein even the functions related to the display of the contents of the master data file and secondary data file can be centralized. This embodiment, however, requires that personal computers 120 remain connected to the central database, as by a network connection, at all times in order to function.

As shown in FIG. 3, step 5 is completed after each of the reviewers 202, 204 and 206 designated by owner 130 have completed their review of document 122 contained in master data file 124, their respective secondary data files 128*a*, 128*b* and 128*c* are sent to central database 102. Although it is well known in the art to send data to a database via a data file, it is critical that the process for generating the secondary data files not alter the contents of the master data file 124.

In step 6, central database 102 integrates the secondary data files from each of the reviewers, generating integrated data file 140 which is returned to owner 130. Owner 130 preferably views document 122 and the comments of reviewers 202, 204 and 206 on a single display simultaneously. FIG. 10 shows display 70 having editing window 72 wherein document 122 is displayed, and comment window 74 wherein the comments 76 of reviewers 202 (L1R1), 204 (L1R2) and 206 (L1R3) are displayed. Ideally, each of the paragraphs, that has generated a comment or modification from any one or multiple reviewers, is demarcated with a color object or glyph 75 to allow easy spotting of where the modifications are. Owner 130 accepts or rejects the changes from all the reviewers and free edits the document 122. Alternately, as described in detail below, in lieu of generating an integrated data file 140, central database 102 may virtually integrate the contents of the secondary data files 128*a*, 128*b* and 128*c* by displaying the suggested changes of multiple reviewers by reference to the index.

At the completion of step 6 of FIG. 3, a new version of document 122 is then published, at which time the review process may begin again at step 1 followed by the creation of a new master data file 124 containing the revised document 122*a* and selection by owner 130 of a distribution list identifying the same or different reviewers.

Figure 5:
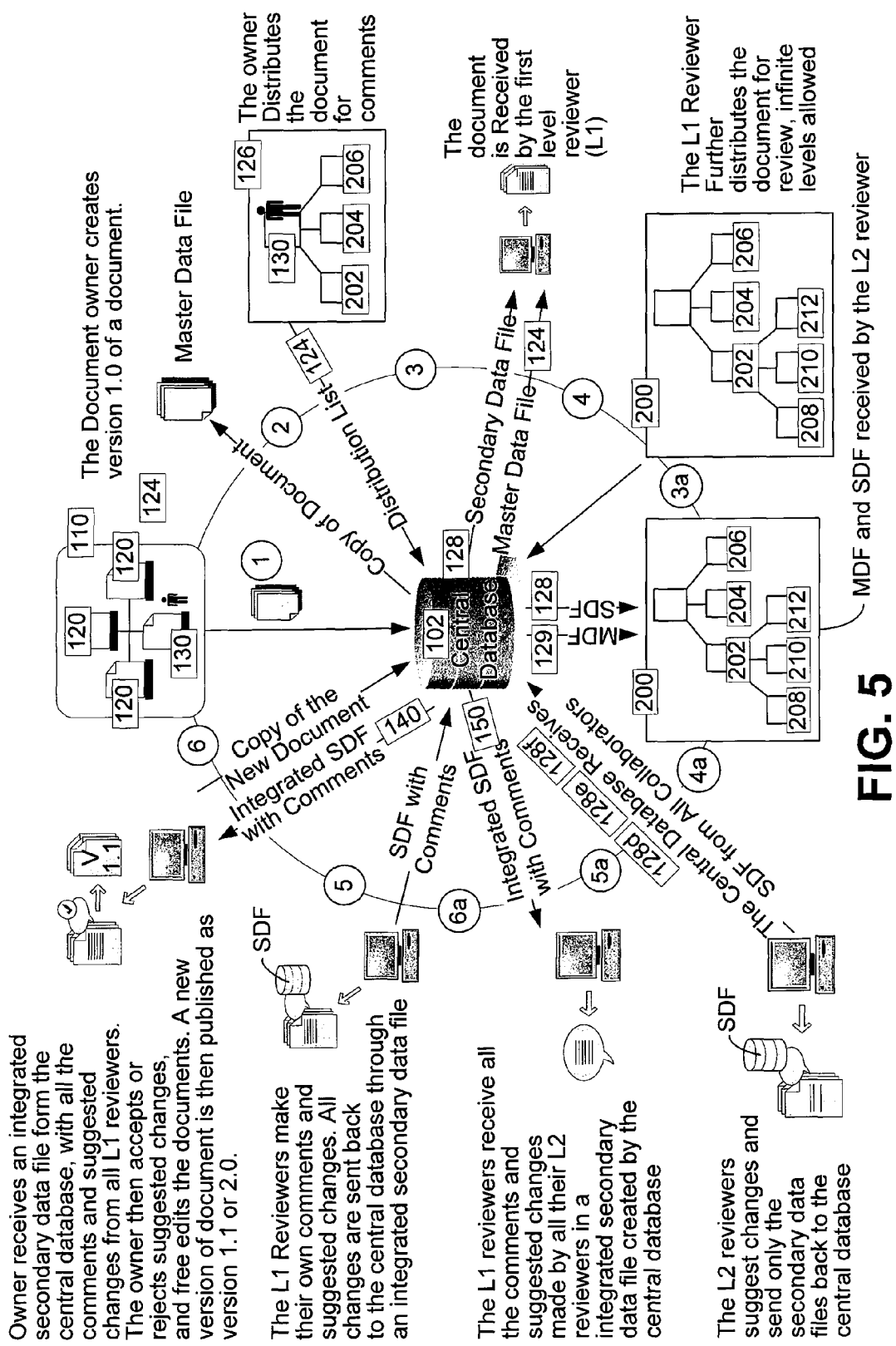
FIG. 5 is a flow chart illustrating the document review system of the present invention.

Although FIG. 3 illustrates the system of the present invention as applied to a single level of reviewers subordinate to owner 130, it is possible to carry out the review process shown in FIG. 3 through multiple levels of reviewers. As shown in FIG. 5, the process shown in FIG. 3 can be expanded such that the reviewers 202, 204 and 206 as designated by owner 130, upon receiving a copy of the master data file and respective secondary data file may themselves designate a number of subordinate reviewers to which the document is to be distributed for comment.

With reference to FIG. 5, it can be seen that steps 1 through 6 are the same as those disclosed in the embodiment of FIG. 3. Specifically, in step 1 owner 130 creates a document 122 which is stored by central database 102 in master data file 124 and locked in step 2. In step 3, owner 130 designates a distribution list 126 identifying a plurality of reviewers 202, 204 and 206. In step 4, each of the reviewers designated by owner 130 receives a copy of master data file 124 containing document 122 and a unique secondary data file 128 associated with document 122 and the reviewer. In step 5, reviewers 202, 204 and 208 return their respective secondary data files 128*a*, 128*b* and 128*c* containing suggested changes to central database 102 which in step 6 are integrated and viewed by owner 130 who accepts or rejects the suggested changes, free-editing the document 122.

However, the embodiment of FIG. 5 differs from that shown in FIG. 3 in that after each of the reviewers 202, 204 and 206 invited to review document 122 by owner 130 have received master data file 124 and secondary data file 128 in step 4, each of the reviewers may designate by invitation their own distribution list of reviewers. This step, shown in FIG. 5 as step 3*a* wherein reviewer 202 designates a distribution list 200 inviting reviewers 208, 210 and 212, is similar to step 3 with the result that the relationship between first level reviewer 202 and second level reviewers 208, 210 and 212 is similar to the relationship between owner 130 and first level reviewer 202. Therefore, in a similar manner to the distribution of files shown in step 4, central database 102 distributes in step 4*a* of FIG. 5 a copy of master data file 124 and a unique secondary data file to each of reviewers 208, 210 and 212 designated, for example by reviewer 202. Any additional reviewers designated by reviewers 204 and 206 would similarly receive master data file 124 and a unique secondary file 128 in step 4*a*.

It is also possible that between steps 4 and 4*a*, one or more of the second level reviewers 202, 204 or 206 may populate their respective secondary data files with suggested changes prior to inviting a second level of reviewers such as 208, 210 and 212 to comment thereon. For example, the master data file sent to reviewers 208, 210 and 212 could be either master data file 124 containing the same document 122 reviewed by reviewer 202, or the file distributed in step 4*a* could be master data file 124*a* containing document 122 plus the changes suggested by reviewer 202. If reviewer 202's changes are sent to reviewers 208, 210 and 212 in step 4*a*, they would preferably be viewable by those reviewers through integration by central database 102 as though the changes were part of the original document. However, such integration would be virtual as changes to document 122 are preferably permitted only by owner 130.

The next step in FIG. 5, step 5*a* is similar to step 5 in that each of the level 2 reviewers 208, 210 and 212 submit their respective secondary data files 128*d*, 128*e* and 128*f* to the central database. Thereafter, in step 6*a*, the secondary data files of the level 2 reviewers are integrated by central database 102 into an integrated file 150 which is viewed by the designating level 1 reviewer. Preferably, only reviewer 202, for example, may view the changes suggested by reviewers 208, 210 and 212. Conversely, only reviewers 204 and 206 may view the comments of their respectively designated reviewers, if any. Alternately, reviewer 202 may allow reviewers 208, 210 and 212 to view each other's comments. As discussed in greater detail below, this step is similar to step 6 with the exception that level 1 reviewers such as 202 may not edit the document 122 directly. Instead, any changes accepted or suggested, for example, by reviewer 202 are merely incorporated into reviewer 202's secondary data file without modifying the contents of master data file 124.

The process disclosed in FIG. 5 allows for an unlimited number of subordinate reviewers at each level as well as an unlimited number of levels of sub-distribution. Ideally, the sub-distribution of documents takes place hierarchically. With particular reference to FIG. 4 the hierarchy among reviewers in a multiple levels can be shown in greater detail.

As discussed above, owner 130 has designated a first level, Level 1 or L1 of subordinate reviewers 202, 204 and 206, (R1, R2 and R3 respectively) to review a document, shown in FIG. 3 as 122. The designation of reviewers of document 122 as master data file 124 is shown by the arrows linking the owners and the multiple levels of reviewers. As discussed above, each reviewer is identified by a unique designation associated with the secondary file allocated to that reviewer by central database 102 (FIG. 3) shown as a concatenation of the rank L1 of the reviewer and the reviewer's order within that level R1, R2 and R3. In turn, each reviewer 202, 204 and 206 may designate a second level, Level 2 or L2 of subordinate reviewers. For example, reviewer 202 has designated reviewers 208, 210 and 212. Similarly to the reviewers at Level 1, the Level 2 reviewers each receive a copy of master data file 124 and have a unique secondary data file allocated by central database 102, and associated with one particular reviewer identified in FIG. 4 as a concatenation of the designating reviewer's (202's) identification, L1R1, which forms the prefix of reviewer 208's hierarchical identity, and 208's order within in L2 as R1. Hence, reviewer 208 can be uniquely identified as L1R1-L2R1, as can the secondary data file associated with reviewer 208.

The convention of identifying the reviewer's secondary file by concatenating the identity of the designating reviewer with that of the designated reviewer is shown in FIG. 4 carried out to Level 4. As would be obvious to one skilled in the art, this process can be carried out indefinitely resulting in a hierarchy as broad and deep as the size of the population of reviewers requires or permits. Furthermore, although it is preferable that each secondary file be uniquely linked to a single reviewer, any known method of establishing the identity of each reviewer associated with a particular secondary file would achieve the same result.

In addition to the rank of the reviewers, distinctions can be made among "lines" of reviewers based upon their relationship to the reviewers hierarchically above them. FIG. 4 shows reviewers 202, 204 and 206 having been designated by owner 130. As level 1 reviewers 202, 204 and 206 designate subordinate reviewers, they become the head of a line of reviewers, I, II and III respectively. For example, as discussed above, reviewer 202 has designated subordinate reviewers 208, 210 and 212. Reviewer 208 has, in turn, designated subordinate reviewer 220. Reviewers 210 and 212 have similarly designated subordinate reviewers. Every reviewer for which "lineage" can be traced to reviewer 202 belong to the same "line" of reviewers. Similarly, reviewer 204 has designated subordinate reviewer 214 who belongs to line II and reviewer 206 has designated reviewers 216 and 218 belonging to line III. Hierarchical sublines exist when a subordinate reviewer designates further subordinate reviewers. Therefore, the heads sublines A, B and C can be identified as reviewers 208, 210 and 212 respectively.

The existence of each hierarchical line and subline as well as the place of a particular reviewer within it can readily be determined by referring to the reviewers hierarchical identity. For example, the prefix of reviewer 230's hierarchical identity of L1R1L2R2L3R2 identifies each of reviewer 202 (L1R1), 210 (L2R2) and 222 (L3R2) as the head of progressively subordinate hierarchical lines.

Therefore, the hierarchy established by the sub-distribution of the document 122 in FIG. 5 creates relationships among the reviewers that can be defined by hierarchical rules. For example, the relationship between reviewer 202 and 208 is similar to that established between owner 130 and reviewer 202. Therefore, the review process shown in FIG. 3 and described above between owner 130 and Level 1 reviewers 202, 204 and 206 is applied in the same manner in FIG. 5 between reviewer 202 and Level 2 reviewers 208, 210 and 212 with reviewer 202 in the place of the owner.

Thus, as shown in FIG. 5, after step 4*a*, the L2 reviewers suggest changes which are captured in their secondary data files. In the case of reviewers 208, 210 and 212, secondary data files, uniquely associated with hierarchical identifications L1R1-L2R1, L1R1-L2R2 and L1R1-L2R3 (FIG. 4) respectively are received by central database 102. The central database integrates the files and submits the integrated secondary data file 150 to reviewer 202 who selectively incorporates the changes suggested by reviewers 208, 210 and 212. These changes are incorporated into reviewer 202's secondary data file, associated with level and rank L1R1, which is then submitted, with any changes reviewer 202 independently suggests, back to central database 102 for return with the other Level 1 reviewers to owner 130.

Therefore, as discussed above, the review process between hierarchical levels shown in FIG. 5 follows the same process as that set forth in FIG. 3 with the critical exception that only the owner may modify the document 122. Although each reviewer who designates reviewers at a subordinate level stands in the same position, hierarchically, over those reviewers as owner 130 stands over Level 1 reviewers 202, 204 and 206, each reviewer may only modify the contents of a secondary data file 128 which has no direct effect on the contents of the master data file 124. The owner, however, has no hierarchical superior, and therefore is allocated no secondary data file, but instead modifies document 122 directly.

Figure 6:
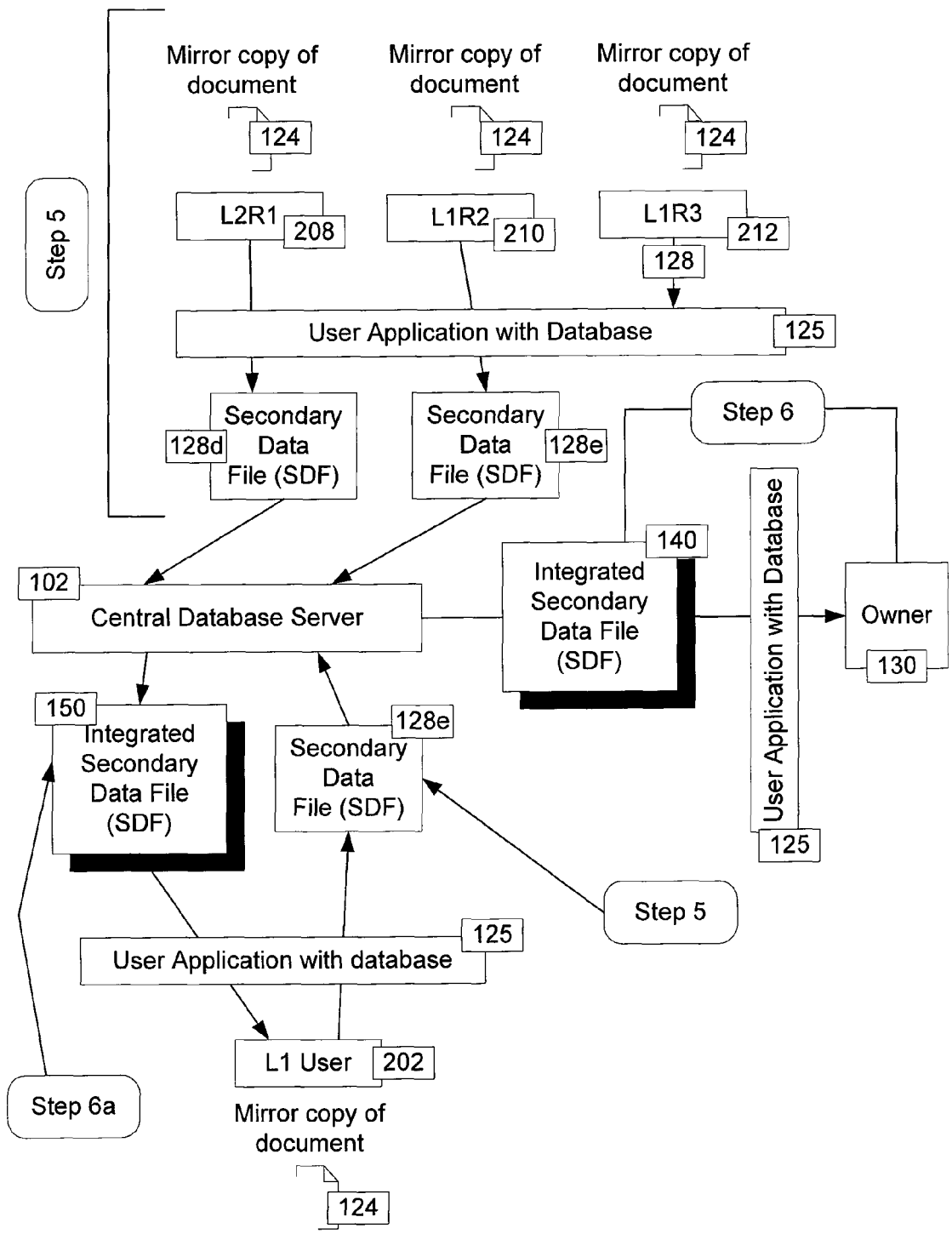
FIG. 6 is a flow chart illustrating the preferred data flow of an aspect of the present invention.

FIG. 6 illustrates the multi-level review process illustrated in FIG. 5 in greater detail as it may takes place in practice. As discussed above with respect to FIG. 5, owner 130 has designated by invitation level 1 reviewers 202, 204 and 206 and distributed master data file 124 and secondary data file 128 in steps 1 to 4. Reviewer 202 has similarly invited and distributed to level 2 reviewers 208, 210 and 212 in steps 3a to 4a. Therefore, as shown in FIG. 6, level 1 reviewer 202 and 202's level 2 reviewers have received copies of master data file 124. Using software such as local database or thin client 125, each level 2 reviewer 208, 210 and 212 views the contents of master data file 124 and populates a unique secondary data file 128d 128e and 128f with suggested changes respectively without modifying the contents of master data file 124 this is shown in FIGS. 5 and 6 as step 5a.

In practice, the process of reviewing a document may be completed at different times by different reviewers. For example, a particular level 2 reviewer may be waiting for suggested changes from designated reviewers at level 3, or may be temporarily disconnected from the network which may cause delay in submission of that reviewer's secondary data file to central database 102. Therefore, although the level 1 reviewers such as 202 would ordinarily wait until the review process was completed by all of the subordinate reviewers before undertaking his or her own review, a level 1 reviewer may query the central database 102 at any time to initiate step 6a to view the contents the secondary files currently submitted by subordinate reviewers. As shown in FIG. 6, the secondary data files 128d and 128e have been transmitted to the central database 102 at a time when reviewer 212 has not yet submitted secondary data file 128f Thus, integrated secondary file 150 would contain only the suggested changes stored in the secondary data files 128d and 128e. However, when reviewer 212 has finished reviewing document 122, reviewer 202 may again query the central database 102, thereby repeating step 6a. Integrated secondary data file 150 would then contain the suggested changes of all three level 2 reviewers.

Upon querying central Database 102, level 1 reviewer 202 receives integrated secondary data file 150 which contains the suggested changes contained in the secondary data files 128d and 128e submitted to the central database 102 by level 2 reviewers 208 and 210 who have completed their review of the contents of master data file 124. In step 5, reviewer 202 views the contents of master data file 124 and the suggested changes of the level 2 reviewers using software such as local database or thin client 125. The suggested changes in integrated secondary data file 150 that are accepted by level 1 reviewer 202 as well as those changes independently suggested by reviewer 202 are captured in secondary data file 128a which is submitted to central database 102 where it is integrated with the suggested changes of the other level 1 reviewers without modifying the contents of master data file 124 into integrated secondary data file 140. Owner 130 may then, as shown in step 6, view the integrated secondary data file 140 to modify the contents of document 122 as discussed above using software such as local database or thin client 125.

Thus, whereas FIG. 3 illustrates the document collaboration process of the present invention in a single line two-level review, the process ideally takes place simultaneously across multiple lines and levels. Therefore, the review process shown in FIG. 5 is a recursive process managed by central database 102 and repeated from the bottom of the hierarchy illustrated in FIG. 4 to the owner 130 at the top. However, as illustrated by FIGS. 5 and 6, the multi-level review process at no time modifies the contents of the master data file. The modification of the master data file is undertaken only upon final review by owner 130.

Ideally, the review process is structured hierarchically such that the suggested changes of a particular reviewer are only viewable by those designating reviewers of immediately superior rank and within the same line. Thus, the suggested changes of third level reviewer 220 as shown in FIG. 4 are viewable only by that reviewer's designating reviewer, second level reviewer 208. Likewise, the suggested changes of second level reviewer 208 are only viewable by first level reviewer 202.

The embodiments of the present invention described above have generally been directed to a system for developing and reviewing documents wherein each reviewer at every level has the ability to view the entire document distributed for review by a document owner. Although such a system may work well for document review within a single organization defined as those connected to the same central database, there may still be cases where it would be desirable to invite certain reviewers within an organization to comment on only part of a document. Furthermore, it is possible that an owner may wish to send a document for review to an outside organization and may therefore wish to conceal confidential information while still obtaining meaningful suggestions as to non-confidential portions of a document.

For example, as shown in FIG. 4, owner 130 may invite a sub-owner 330 who may belong to a different organization to review a document. Sub-owner 330 may create an independent collaboration tree 340 within the sub-owner's organization using the system of the present invention and a central database other than central database 102. Therefore, should owner 130 wish to exclude specific portions of document 122, such portions could be extracted prior to sending the document to sub-owner 330 resulting in modified document 122a which may be submitted in locked format as master data file 124a. Thus, after document 122a is reviewed by sub owner 330 and collaboration tree 340, secondary data file 328 containing suggested changes is returned to owner 130.

Although submitting modified document 122a is shown implemented when document 122 is sent to an outside organization, similar restrictions are possible within owner 130's organization, either by creating a modified document such as 122a or by managing access to document 122 by implementing access restrictions through central database 102.

Further, the system of the present invention can be utilized to conduct document review in real-time wherein a group of physically remote reviewers can simultaneously view and comment on a document. In this embodiment, the suggested changes of invited reviewers at each level would be instantaneously viewable to the inviting reviewers above them.

While the preferred embodiments of the invention have been illustrated and described, it will be appreciated that various changes can be made therein without departing from the spirit and scope of the invention.

What is claimed is:

1. A computer-based document collaboration system for managing the simultaneous input of a plurality of reviewers connected over a network of computers, the document collaboration system comprising:

a master data file including a document having contents, and secondary data files respectively associated with said plurality of reviewers for tracking edits made to the contents of said document;

wherein respective simultaneous edits from said plurality of reviewers that change the contents of said document are stored in said secondary data files;

wherein the respective edits in the secondary data files include respective information specifying respective positions within said document for the respective edits of the contents of the document;

wherein respective edits from said plurality of reviewers corresponding to a position among said respective positions within said document are simultaneously displayed to said plurality of reviewers adjacent to said document in response to activation of a control representing said position within said document; and wherein as a result of accepting an edit stored in a secondary data file, the document collaboration system modifies the contents of the document according to the edit.

2. The computer-based document collaboration system of claim 1, wherein each of said plurality of reviewers is uniquely identifiable by said network, and wherein the master data file includes information specifying review privileges for at least one of said plurality of reviewers.

3. The computer-based document collaboration system of claim 2, wherein said edits stored in at least one of said secondary data files displays a subset of the edits in the secondary data file associated with a given reviewer.

4. The computer-based document collaboration system of claim 3, wherein said document is created by at least one owner and said at least one owner designates at least one of said reviewers.

5. The computer-based document collaboration system of claim 4, wherein said owner selectively incorporates said edits stored in the secondary data files into said document of the master data file.

6. The computer-based document collaboration system of claim 3, wherein at least a portion of said document and respective portions of said edits are displayed simultaneously in separate portions of a display device.

7. The computer-based document collaboration system of claim 6, wherein said respective portions of said edits displayed correspond to said portion of said document displayed.

8. The computer program product of claim 1, wherein the network of computers includes the Internet.

9. The system of claim 1, wherein at least one of said plurality of reviewers has been designated by another of said plurality of reviewers.

10. A computer-based document collaboration method for managing the simultaneous input of a plurality of reviewers connected over a network of computers, the method comprising:

including a document having contents in a master data file;

respectively associating secondary data files with said plurality of reviewers for tracking edits made to the contents of said document;

storing in said secondary data files respective simultaneous edits from said plurality of reviewers that change the contents of said document;

specifying in the respective edits in the secondary data files respective information for respective positions within said document for the respective edits of the contents of the document;

simultaneously displaying to said plurality of reviewers respective edits from said plurality of reviewers corresponding to a position among said respective positions within said document adjacent to said document in response to activation of a control representing said position within said document; and when an edit stored in a secondary data file is accepted, modifying the contents of the document according to the edit.

11. The method of claim 10, wherein each of said plurality of reviewers is uniquely identifiable by said network, and wherein the master data file includes information specifying review privileges for at least one of said plurality of reviewers.

12. The method of claim 11 further comprising:

displaying a subset of the edits in the secondary data file associated with a given reviewer.

13. The method of claim 12, wherein said document is created by at least one owner and said at least one owner designates at least one of said reviewers.

14. The method of claim 13 further comprising:

said owner selectively incorporating said edits stored in the secondary data files into said document of the master data file.

15. The method of claim 12, wherein at least a portion of said document and respective portions of said edits are displayed simultaneously in separate portions of a display device.

16. The method of claim 15, wherein said respective portions of said edits displayed correspond to said portion of said document displayed.

17. The method of claim 10, wherein at least one of said plurality of reviewers has been designated by another of said plurality of reviewers.

18. The method of claim 10, wherein the network of computers includes the Internet.

19. A computer program product for a document collaboration method for managing the simultaneous input of a plurality of reviewers connected over a network of computers, including one or more computer readable instructions embedded on a computer readable medium and configured to cause one or more computer processors to perform steps comprising:

including a document having contents in a master data file;

respectively associating secondary data files with said plurality of reviewers for tracking edits made to the contents of said document;

storing in said secondary data files respective simultaneous edits from said plurality of reviewers that change the contents of said document;

specifying in the respective edits in the secondary data files respective information for respective positions within said document for the respective edits of the contents of the document;

simultaneously displaying to said plurality of reviewers respective edits from said plurality of reviewers corresponding to a position among said respective positions within said document adjacent to said document in response to activation of a control representing said position within said document; and when an edit stored in a secondary data file is accepted, modifying the contents of the document according to the edit.

20. The computer program product of claim 19, wherein each of said plurality of reviewers is uniquely identifiable by said network, and wherein the master data file includes information specifying review privileges for at least one of said plurality of reviewers.

21. The computer program product of claim 20 further comprising:

displaying a subset of the edits in the secondary data file associated with a given reviewer.

22. The computer program product of claim 21, wherein said document is created by at least one owner and said at least one owner designates at least one of said reviewers.

23. The computer program product of claim 22 further comprising:

said owner selectively incorporating said edits stored in the secondary data files into said document of the master data file.

24. The computer program product of claim 21, wherein at least a portion of said document and respective portions of said edits are displayed simultaneously in separate portions of a display device.

25. The computer program product of claim 24, wherein said respective portions of said edits displayed correspond to said portion of said document displayed.

26. The computer program product of claim 19, wherein at least one of said plurality of reviewers has been designated by another of said plurality of reviewers.

27. The computer program product of claim 19, wherein the network of computers includes the Internet.

* * * * *

UNITED STATES PATENT AND TRADEMARK OFFICE
CERTIFICATE OF CORRECTION

| | | |
|---|---|---|
| PATENT NO. | : 7,818,678 B2 | Page 1 of 1 |
| APPLICATION NO. | : 10/285910 | |
| DATED | : October 19, 2010 | |
| INVENTOR(S) | : Deepak Massand | |

It is certified that error appears in the above-identified patent and that said Letters Patent is hereby corrected as shown below:

In claim 8, column 13, line 47, "The computer program product of claim 1," should read
--The system of claim 1,--.

Signed and Sealed this
Twenty-eighth Day of December, 2010

David J. Kappos
*Director of the United States Patent and Trademark Office*